US011863070B2

(12) United States Patent
Itten et al.

(10) Patent No.: US 11,863,070 B2
(45) Date of Patent: Jan. 2, 2024

(54) DC/DC CONVERTER AND NETWORK FEEDBACK UNIT

(71) Applicant: Lenze Swiss AG, Romanshorn (CH)

(72) Inventors: Alex Itten, Romanshorn (CH); Benjamin Faessler, Waldstatt (CH); Christof Schneggenburger, Guettingen (CH); Dirk Schekulin, Gais (CH); Ewgeni Hoffmann, Aerzen (DE)

(73) Assignee: Lenze Swiss AG, Romanshorn (CH)

( * ) Notice: Subject to any disclaimer, the term of this patent is extended or adjusted under 35 U.S.C. 154(b) by 510 days.

(21) Appl. No.: 17/264,806

(22) PCT Filed: Jul. 9, 2019

(86) PCT No.: PCT/EP2019/068436
§ 371 (c)(1),
(2) Date: Sep. 8, 2021

(87) PCT Pub. No.: WO2020/025267
PCT Pub. Date: Feb. 6, 2020

(65) Prior Publication Data
US 2021/0408907 A1 Dec. 30, 2021

(30) Foreign Application Priority Data

Aug. 1, 2018 (DE) ...................... 10 2018 212 825.1

(51) Int. Cl.
*H02M 3/158* (2006.01)
*H02M 1/00* (2006.01)
*H02M 7/5387* (2007.01)

(52) U.S. Cl.
CPC ........... *H02M 3/158* (2013.01); *H02M 1/007* (2021.05); *H02M 7/5387* (2013.01)

(58) Field of Classification Search
CPC ..... H02M 3/158; H02M 1/007; H02M 7/5387
See application file for complete search history.

(56) References Cited

U.S. PATENT DOCUMENTS 10,615,692 B2 * 4/2020 Khayat ................ H02M 3/158
10,773,601 B2 * 9/2020 Curuvija ........... H02M 7/53871
(Continued)

FOREIGN PATENT DOCUMENTS

| DE | 10 2005 047 373 A1 | 4/2007 |
| DE | 10 2009 032 259 A1 | 1/2011 |
| WO | WO 2017/072297 A1 | 5/2017 |

OTHER PUBLICATIONS

International Search Report (PCT/ISA/210) issued in PCT Application No. PCT/EP2019/068436 dated Sep. 24, 2019 with English translation (four (4) pages).
(Continued)

*Primary Examiner* — Adolf D Berhane
(74) *Attorney, Agent, or Firm* — Crowell & Moring LLP

(57) ABSTRACT

A DC/DC converter includes: a first connection pole and a second connection pole, wherein a first DC voltage is applied between the first connection pole and the second connection pole; a third connection pole and a fourth connection pole, wherein a second DC voltage is applied between the third connection pole and the fourth connection pole; a first commutation cell, wherein the first commutation cell has a capacitor, a diode and a semiconductor switch; a second commutation cell, wherein the second commutation cell has a capacitor, a diode and a semiconductor switch; and a precharging circuit for precharging the capacitor of the first commutation cell and the capacitor of the second commutation cell. The precharging circuit has a precharging resistor and an actuable switching device. The precharging resistor and the actuable switching device are connected in parallel. The capacitor of the first commutation cell, the precharging circuit and the capacitor of the second commutation cell are looped in series between the first connection pole and the second connection pole.

12 Claims, 2 Drawing Sheets

(56) References Cited

U.S. PATENT DOCUMENTS

2017/0302068 A1   10/2017  Kubouchi et al.
2018/0367062 A1   12/2018  Schneggenburger et al.
2023/0166633 A1*  6/2023   Lee .................... B60L 50/51
                                                         320/128

OTHER PUBLICATIONS

German-language Written Opinion (PCT/ISA/237) issued in PCT Application No. PCT/EP2019/068436 dated Sep. 24, 2019 (seven (7) pages).
German-language Office Action issued in German Application No. 10 2018 212 825.1 dated May 27, 2019 (eight (8) pages).

\* cited by examiner

DC/DC CONVERTER AND NETWORK FEEDBACK UNIT

BACKGROUND AND SUMMARY OF THE INVENTION

The invention relates to a DC/DC converter and to a grid feedback unit having such a DC/DC converter.

WO 2017/072297 A1 discloses a grid feedback unit that is designed to feed electrical energy from a voltage intermediate circuit into a three-phase grid. The grid feedback unit has a step-down converter unit having a first DC/DC converter in the form of a step-down converter and a second DC/DC converter in the form of a step-down converter, wherein the first step-down converter and the second step-down converter are connected in parallel and are each electrically coupled at input to the voltage intermediate circuit.

The invention is based on the object of providing a DC/DC converter and a grid feedback unit having such a DC/DC converter that are able to be manufactured inexpensively and/or exhibit low power losses.

The invention achieves this object by way of a DC/DC converter and by way of a grid feedback unit, in accordance with the independent claims.

The DC/DC converter conventionally has a first connection pole and a second connection pole, wherein a first DC voltage is present or is output or applied between the first connection pole and the second connection pole.

The DC/DC converter furthermore has a third connection pole and a fourth connection pole, wherein a second DC voltage is present or is output or applied between the third connection pole and the fourth connection pole.

The first DC voltage and the second DC voltage typically have different voltage levels.

The DC/DC converter furthermore has a first switching cell, wherein the first switching cell has a capacitor, a diode and a driveable semiconductor switching means, for example in the form of a field-effect transistor or IGBT.

The DC/DC converter furthermore has a second switching cell, wherein the second switching cell has a capacitor, a diode and a semiconductor switching means, for example in the form of a field-effect transistor or IGBT.

The semiconductor switching means of the first and of the second switching cell are preferably driven or clocked such that the levels of the first and of the second DC voltage have a predefined value.

The capacitor of the first switching cell and the capacitor of the second switching cell may together form a buffer capacitor to be precharged.

The DC/DC converter furthermore has a precharging circuit for precharging the capacitor of the first switching cell and the capacitor of the second switching cell. The precharging circuit has a precharging resistor and a driveable switching means, for example in the form of a relay, wherein the precharging resistor and the driveable switching means are connected in parallel.

The capacitor of the first switching cell, the precharging circuit, that is to say the precharging resistor and the parallel-connected driveable switching means, and the capacitor of the second switching cell are wired in series between the first connection pole and the second connection pole.

According to one embodiment, the first switching cell is wired between the first connection pole and the third connection pole and the second switching cell is wired between the second connection pole and the fourth connection pole.

According to one embodiment, the DC/DC converter has a control unit that is designed to drive the driveable switching means of the precharging circuit such that the driveable switching means is opened during a precharging phase of the capacitor of the first switching cell and of the capacitor of the second switching cell. The precharging phase may have a predefined duration. The precharging phase may be ended as soon as a predefined threshold voltage has been established at the capacitors to be precharged. Opening the switching means of the precharging circuit has the effect that a switch-on current is limited when the first DC voltage and/or the second DC voltage is activated or switched on, since the precharging resistor is active in the charging current path, that is to say is not short-circuited.

According to one embodiment, the precharging circuit has a capacitor, wherein the precharging resistor, the driveable switching means and the capacitor are connected in parallel. A capacitance of the capacitor of the precharging circuit may be smaller than a capacitance of the capacitor of the first switching cell and may be smaller than a capacitance of the capacitor of the second switching cell.

According to one embodiment, the first switching cell has a coil, wherein the switching means of the first switching cell and the coil of the first switching cell are wired in series between the first connection pole and the third connection pole. The second switching cell accordingly has a coil, wherein the switching means of the second switching cell and the coil of the second switching cell are wired in series between the second connection pole and the fourth connection pole.

According to one embodiment, the capacitor and the diode of the first switching cell together form a first switching path that assumes a current flowing through the coil of the first switching cell when the switching means of the first switching cell is opened. The capacitor and the diode of the second switching cell accordingly together form a second switching path that assumes a current flowing through the coil of the second switching cell when the switching means of the second switching cell is opened.

According to one embodiment, the DC/DC converter or its precharging circuit is dimensioned such that a switching current flowing through the precharging circuit is smaller than respective switching currents in the first switching cell and in the second switching cell and the switching current flowing through the precharging circuit is smaller than respective main currents through the coil of the first switching cell and the coil of the second switching cell. A switching current is in this case typically that current that is transferred from one conductive branch to another conductive branch. By way of example, the switching current flows for the closed contact or when the switching means of the precharging circuit is closed. In this respect, reference is otherwise also made to the relevant specialist literature.

According to one embodiment, the precharging circuit is designed to limit a switch-on current when the first DC voltage is activated if the semiconductor switching means of the first switching cell is designed to be reverse-blocking and the semiconductor switching means of the second switching cell is designed to be reverse-blocking. This is achieved for example by opening the switching means of the precharging circuit and dimensioning the precharging resistor accordingly.

According to one embodiment, the precharging circuit is designed to limit a switch-on current when the first DC voltage is activated and/or when the second DC voltage is activated if the semiconductor switching means of the first switching cell is designed to be reverse-conducting and the semiconductor switching means of the second switching cell is designed to be reverse-conducting. This is achieved for example by opening the switching means of the precharging circuit and dimensioning the precharging resistor accordingly.

According to one embodiment, the precharging resistor of the precharging circuit is an ohmic resistor or a PTC thermistor.

The grid feedback unit according to the invention is designed to feed electrical energy from a voltage intermediate circuit into or back to a three-phase grid.

The grid feedback unit has at least one DC/DC converter described above. The grid feedback unit preferably has two parallel-connected DC/DC converters that are clocked in a manner offset from one another.

The grid feedback unit furthermore has an inverter that is electrically coupled at input to the third connection pole and the fourth connection pole of the DC/DC converter or converters and that is electrically coupled at output to the three-phase grid.

Embodiments are described in more detail below with reference to the drawings.

DETAILED DESCRIPTION OF THE DRAWINGS

Figure 1:
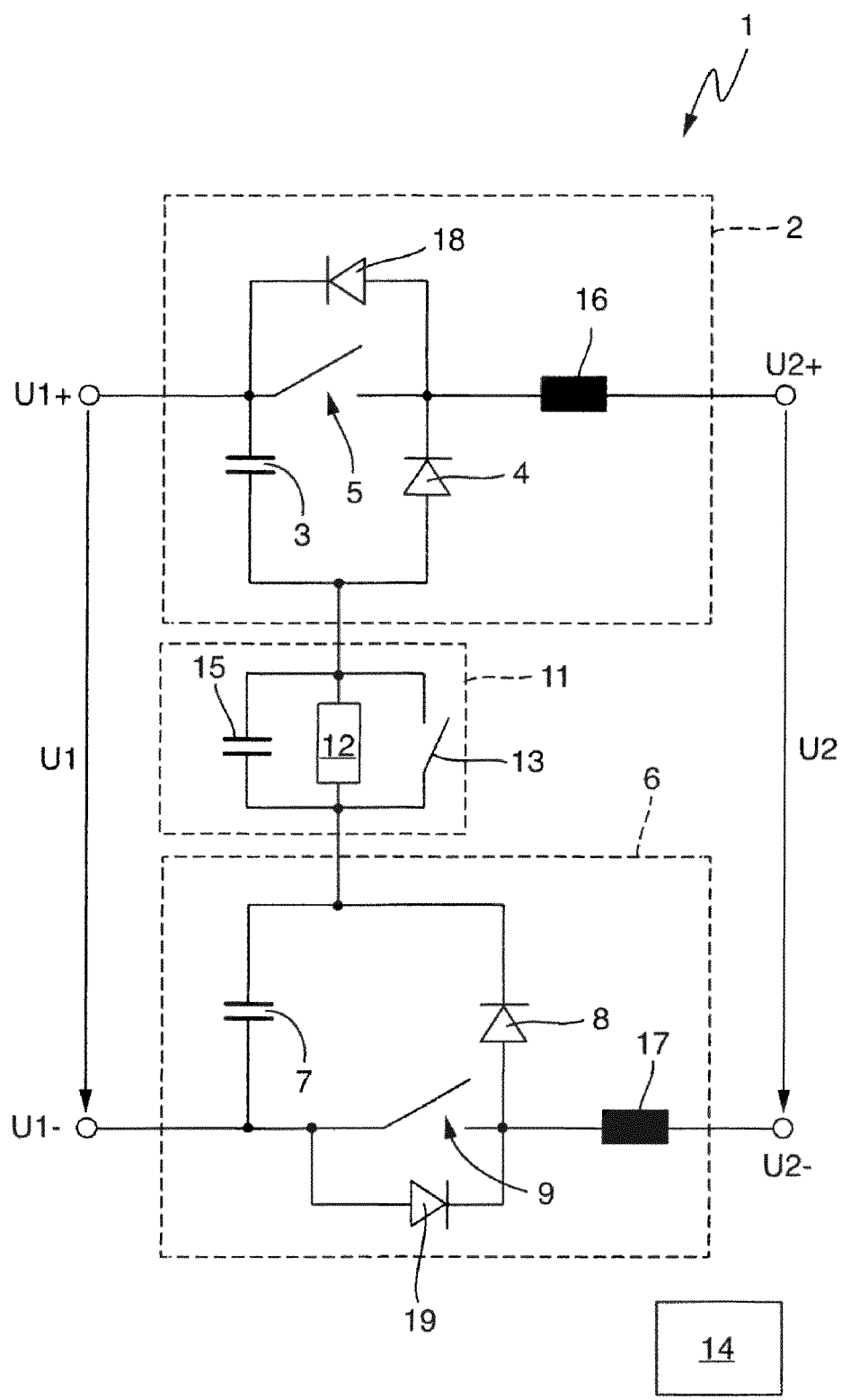
FIG. 1 is a circuit diagram of a DC/DC converter according to an embodiment of the invention.

FIG. 1 shows a circuit diagram of a DC/DC converter 1.

The DC/DC converter 1 has a first connection pole U1+ and a second connection pole U1−, wherein a first DC voltage U1 is present between the first connection pole U1+ and the second connection pole U1−.

The DC/DC converter 1 furthermore has a third connection pole U2+ and a fourth connection pole U2−, wherein a second DC voltage U2 is present between the third connection pole U2+ and the fourth connection pole U2−.

The DC/DC converter 1 furthermore has a first switching cell 2 that has a capacitor 3, a diode 4, a semiconductor switching device 5 and a coil 16. An optional diode 18 is connected in parallel with the semiconductor switching device 5 and wired in the blocking direction between the first connection pole U1+ and the third connection pole U2+. The diode 18 may thus be what is known as a body diode if the semiconductor switching device 5 is embodied as a field-effect transistor. The semiconductor switching device 5 and the coil 16 are wired in series between the first connection pole U1+ and the third connection pole U2+. The diode 4 is electrically connected, by way of its cathode, to the semiconductor switching device 5, the anode of the diode 18 and the coil 16 and is electrically connected, by way of its anode, to the capacitor 3 and a precharging circuit 11.

The DC/DC converter 1 furthermore has a second switching cell 6 that has a capacitor 7, a diode 8, a semiconductor switching device 9 and a coil 17. An optional diode 19 is connected in parallel with the semiconductor switching device 9 and wired in the conducting direction between the second connection pole U1− and the fourth connection pole U2−. The diode 19 may thus be what is known as a body diode if the semiconductor switching device 9 is embodied as a field-effect transistor. The semiconductor switching device 9 and the coil 17 are wired in series between the second connection pole U1− and the fourth connection pole U2−. The diode 8 is electrically connected, by way of its anode, to the semiconductor switching device 9, the cathode of the diode 19 and the coil 17 and is electrically connected, by way of its cathode, to the capacitor 7 and the precharging circuit 11.

The DC/DC converter 1 has the precharging circuit 11 for precharging the capacitors 3 and 7, wherein the precharging circuit 11 has a precharging resistor 12, a driveable switching device in the form of a relay 13 and an optional capacitor 15, wherein the precharging resistor 12, the driveable switching device 13 and the capacitor 15 are connected in parallel.

The capacitor 3 of the first switching cell 2, the precharging circuit 11, that is to say the parallel circuit consisting of precharging resistor 12, driveable switching device 13 and capacitor 15, and the capacitor 7 of the second switching cell 6 are wired in series between the first connection pole U1+ and the second connection pole U1−.

The DC/DC converter 1 has a control unit 14, for example in the form of a microprocessor, which is designed to drive the driveable switching device 13 of the precharging circuit 11 such that the driveable switching device 13 is opened during a precharging phase of the capacitors 3 and 7 in order to charge the capacitors 3 and 7 up to a desired precharging voltage.

The DC/DC converter 1 may be designed as a step-down converter, that is to say U1>U2 holds true.

The capacitance of the capacitor 15 is typically selected to be smaller than the capacitance of the capacitors 3 and 7.

Figure 2:
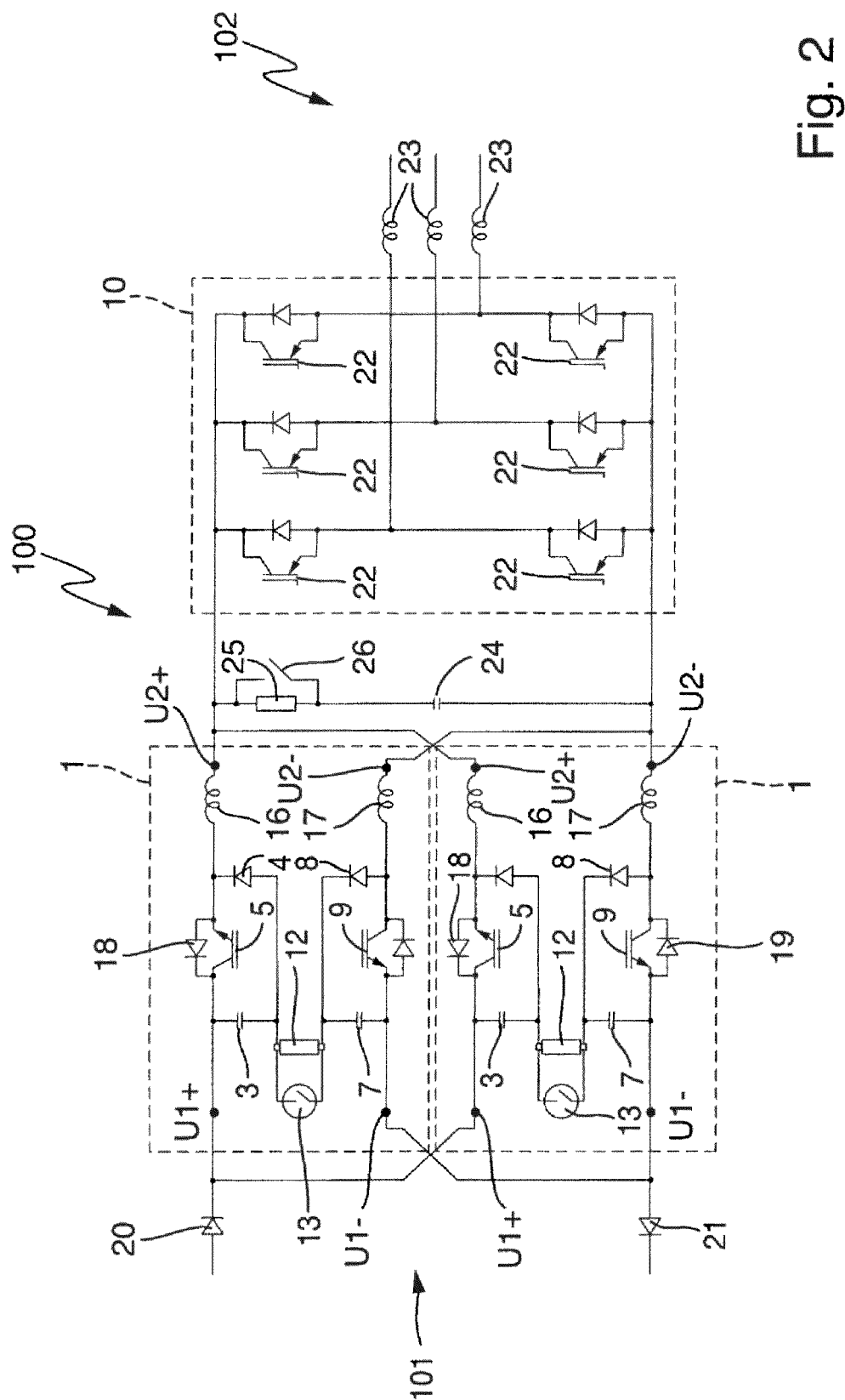
FIG. 2 is a circuit diagram of a grid feedback unit according to an embodiment of the invention having parallel-connected DC/DC converters.

FIG. 2 shows a circuit diagram of a grid feedback unit 100 having two parallel-connected DC/DC converters 1, wherein a respective DC/DC converter 1 corresponds to the DC/DC converter 1 shown in FIG. 1.

The grid feedback unit 100 is designed to feed electrical energy from a voltage intermediate circuit 101 into a three-phase grid 102. The grid feedback unit 100 is based on the grid feedback unit disclosed in WO 2017/072297 A1, and expands on this, in particular with regard to the precharging circuit 11. With regard to the basic functions of the grid feedback unit 100, reference is therefore also made to the disclosure in WO 2017/072297 A1.

The grid feedback unit 100 has two DC/DC converters 1 as shown in FIG. 1 and an inverter 10 that is electrically coupled at input to the respective third connection poles U2+ and the respective fourth connection poles U2− of the DC/DC converters 1 and that is electrically coupled at output to the three-phase grid 102. It goes without saying that, rather than the two DC/DC converters 1, just a single DC/DC converter may also be provided, or more than two DC/DC converters may be connected in parallel.

Between the respective third connection poles U2+ and the respective fourth connection poles U2− of the DC/DC converters 1, a filter capacitor 24 is wired in series together with a precharging circuit having a resistor 25 and a driveable switching device 26. In order to precharge the filter capacitor 24, the switching device 26 is opened. The switching device 26 may be designed as a relay.

The inverter 10 has conventional semiconductor switching device 22 in the form of a bridge circuit. Line chokes 23 are provided on the grid side. The inverter 10 may be operated for example at a switching frequency of >60 kHz or clocked at grid frequency.

The precharging circuit 11 is arranged in a switching region that is used exclusively for low-frequency compensation currents. These compensation currents or ripple currents that occur during operation are considerably smaller than the currents to be transferred from the DC/DC converter, meaning that only a small portion of the switching current flows through the respective switching device 13. As a result, no additional impedance is introduced into the switching path and oscillations or overvoltages at the semiconductor switching device 5 and 9 are able to be avoided. A single switching device or precharging relay 13 is sufficient for each DC/DC converter 1.

This makes it possible for the precharging circuit 11 not to have to be designed for the entire power output of the unit. Due to the resulting low power losses, the precharging circuit 11 and its peripherals are able to be produced on a circuit board without additional cooling.

Diodes 20 and 21 prevent reverse charging of the intermediate circuit 101 from the three-phase grid 102.

The following advantages are able to be achieved by way of the invention: saving on space; lower costs; low power losses, and thus production on an uncooled circuit board; and layout in the region of the intermediate circuit capacitors and thus at a location where the required structural height of the relay is present anyway.

The invention claimed is:

1. A DC/DC converter, comprising:
   a first connection pole and a second connection pole, wherein a first DC voltage is present between the first connection pole and the second connection pole;
   a third connection pole and a fourth connection pole, wherein a second DC voltage is present between the third connection pole and the fourth connection pole;
   a first switching cell, wherein the first switching cell has a capacitor, a diode and a semiconductor switching device;
   a second switching cell, wherein the second switching cell has a capacitor, a diode and a semiconductor switching device; and
   a precharging circuit for precharging the capacitor of the first switching cell and the capacitor of the second switching cell, wherein the precharging circuit has a precharging resistor and a driveable switching device, wherein the precharging resistor and the driveable switching device are connected in parallel,
   wherein the capacitor of the first switching cell, the precharging circuit and the capacitor of the second switching cell are wired in series between the first connection pole and the second connection pole.

2. The DC/DC converter according to claim 1, wherein the first switching cell is wired between the first connection pole and the third connection pole, and the second switching cell is wired between the second connection pole and the fourth connection pole.

3. The DC/DC converter according to claim 1, wherein the DC/DC converter has a control unit that is designed to drive the driveable switching device of the precharging circuit such that the driveable switching device is opened during a precharging phase.

4. The DC/DC converter according to claim 1, wherein the precharging circuit further comprises a capacitor, and the precharging resistor, the driveable switching device and the capacitor are connected in parallel.

5. The DC/DC converter according to claim 4, wherein a capacitance of the capacitor of the precharging circuit is smaller than a capacitance of the capacitor of the first switching cell and is smaller than a capacitance of the capacitor of the second switching cell.

6. The DC/DC converter according to claim 1, wherein the first switching cell has a coil, wherein the switching device of the first switching cell and the coil of the first switching cell are wired in series between the first connection pole and the third connection pole, and
   the second switching cell has a coil, wherein the switching device of the second switching cell and the coil of the second switching cell are wired in series between the second connection pole and the fourth connection pole.

7. The DC/DC converter according to claim 6, wherein the capacitor and the diode of the first switching cell together form a first switching path that assumes the current of the coil of the first switching cell when the switching device of the first switching cell is opened, and
   the capacitor and the diode of the second switching cell together form a second switching path that assumes the current of the coil of the second switching cell when the switching device of the second switching cell is opened.

8. The DC/DC converter according to claim 7, wherein the DC/DC converter is dimensioned such that a switching current flowing through the precharging circuit is smaller than respective switching currents in the first switching cell and in the second switching cell and the switching current flowing through the precharging circuit is smaller than respective main currents through the coil of the first switching cell and the coil of the second switching cell.

9. The DC/DC converter according to claim 1, wherein the precharging circuit is designed to limit a switch-on current when the first DC voltage is activated when the semiconductor switching device of the first switching cell is designed to be reverse-blocking and the semiconductor switching device of the second switching cell is designed to be reverse-blocking.

10. The DC/DC converter according to claim 1, wherein the precharging circuit is designed to limit a switch-on current when the first DC voltage is activated and/or when the second DC voltage is activated when the semiconductor switching device of the first switching cell is designed to be reverse-conducting and the semiconductor switching device of the second switching cell is designed to be reverse-conducting.

11. The DC/DC converter according to claim 1, wherein the precharging resistor of the precharging circuit is an ohmic resistor or a PTC thermistor.

12. A grid feedback unit designed to feed electrical energy from a voltage intermediate circuit into a three-phase grid, comprising:
    at least one DC/DC converter comprising:
      a first connection pole and a second connection pole, wherein a first DC voltage is present between the first connection pole and the second connection pole;
      a third connection pole and a fourth connection pole, wherein a second DC voltage is present between the third connection pole and the fourth connection pole;
      a first switching cell, wherein the first switching cell has a capacitor, a diode and a semiconductor switching device;
      a second switching cell, wherein the second switching cell has a capacitor, a diode and a semiconductor switching device; and
      a precharging circuit for precharging the capacitor of the first switching cell and the capacitor of the second switching cell, wherein the precharging circuit has a precharging resistor and a driveable switching device, wherein the precharging resistor and the driveable switching device are connected in parallel, wherein the capacitor of the first switching cell, the precharging circuit and the capacitor of the second switching cell are wired in series between the first connection pole and the second connection pole; and an inverter that is electrically coupled at input to the third connection pole and the fourth connection pole of the DC/DC converter and that is electrically coupled at output to the three-phase grid.

* * * * *